Patented June 3, 1952

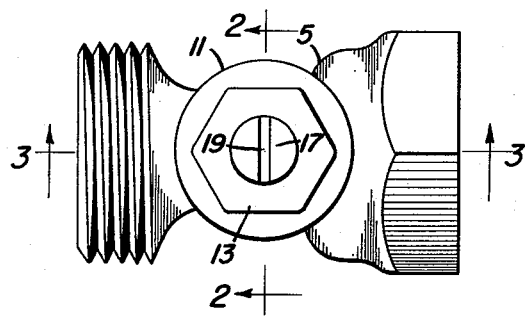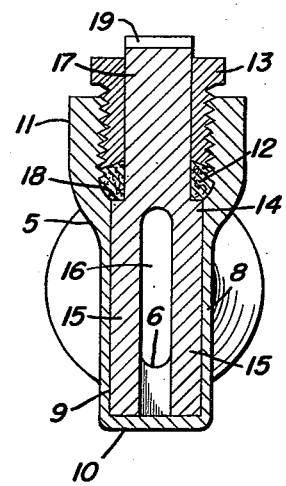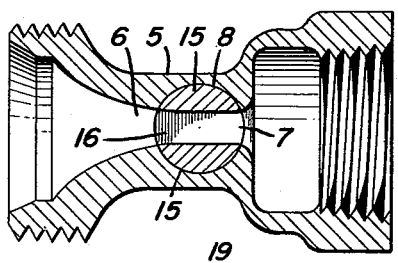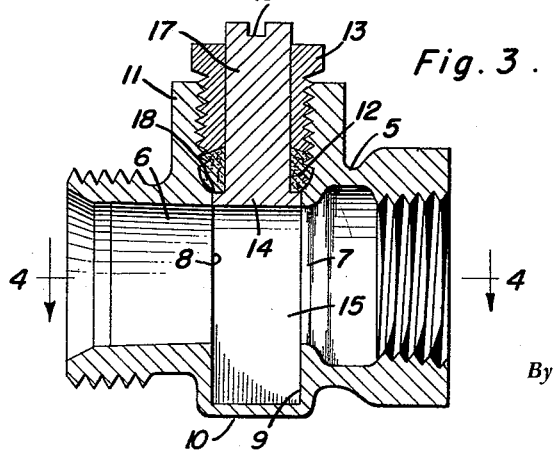

2,599,274

UNITED STATES PATENT OFFICE 2,599,274

ROTARY PLUG VALVE

Edward A. Murnin, Jr., Bethlehem, Pa.

Application March 1, 1949, Serial No. 78,942

1 Claim. (Cl. 251—101)

This invention relates to rotary plug valves primarily adapted to adjust the flow of liquid to heat transfer elements used in hot water heating systems, and the primary object of the invention is to provide an improved plug valve of cheap and simple construction wherein the passage through the valve casing is completely unobstructed when the valve plug is turned to open position.

Another object of the invention is to provide a plug valve of the above kind employing a bifurcated plug whose furcations are tensioned to expand into contact with the wall of a bore of the valve casing, whereby passage of fluid through the valve is effectively and completely prevented when the valve plug is in closed position.

The exact nature of the present invention will become apparent from the following description when considered in connection with the accompanying drawing, in which:

Figure 1 is a top plan view of a plug valve constructed in accordance with the present invention;

Figure 2 is a transverse sectional view thereof taken on the line 2—2 of Figure 1;

Figure 3 is a longitudinal section thereof taken on the line 3—3 of Figure 1; and Figure 4 is a horizontal section taken on the line 4—4 of Figure 3.

Referring in detail to the drawing, 5 indicates a valve casing provided with a longitudinal passage comprising an inlet 6 and an outlet 7, and a cylindrical transverse bore 8 intersecting said passage, said bore being of a greater diameter than the portion of said passage intersected thereby. The bore 8 extends below the bottom of said passage and terminates above the bottom of the casing so as to provide a bottom socket 9 in the casing and to leave an integral closure 10 for the lower end of said bore. The bore opens through the top of the casing and communicates with the larger bore of an internally threaded neck 11 integrally formed on the top of the casing to receive a packing 12 and a packing gland 13.

A cylindrical valve plug 14 is snugly fitted in the bore 8 and consists of a bifurcated rod having solid resilient furcations 15 with a slot or space 16 therebetween which is preferably of the same width as that of the adjacent portion of the longitudinal passage so as to completely open the latter when the plug is turned to the position shown. The furcations 15 are of a width greater than said passage portion so as to completely close the latter when the plug is given a quarter turn from the position shown. It is noted that the furcations 15 are slightly resilient and are tensioned to expand or spread apart into snug contact with the wall of bore 8 so that flow of fluid through the valve is effectively and completely prevented when the valve plug is in closed position. The valve plug has an axial stem 17 integral with its upper end, and such stem is of smaller diameter than the plug so as to provide an annular shoulder 18 at the juncture of the plug and its stem. The packing 12 and gland 13 prevent leakage of fluid from the casing about stem 17 and hold the plug in place seated at the lower end of its furcations upon the closure 10. Suitable means is provided to facilitate turning of the plug, such as a screwdriver kerf 19 in the upper end of stem 17.

From the foregoing description, it is believed that the construction, operation, and advantages of the present invention will be readily understood and appreciated by those skilled in the art. Minor changes and details of construction are contemplated, such as fairly fall within the spirit and scope of the invention as claimed.

Having described the invention, what is claimed as new is:

A rotary plug valve comprising a one-piece casing provided with a longitudinal passage and a cylindrical transverse bore intersecting said passage, said bore being of a greater diameter than the portion of said passage intersected thereby and being extended below the bottom of said passage and terminating above the bottom of the casing, said bore further opening through the top of the casing, a neck integrally formed on the top of the casing and having a bore larger than and communicating with the upper end of the first-named bore, a rotary valve plug fitted in the casing and formed of a cylindrical rod having one end portion bifurcated to provide a pair of similar solid resilient furcations with a space of uniform width therebetween, said furcations being tensioned to spread into snug contact with the wall of the first-named bore, the other end portion of said rod being of reduced diameter to provide a cylindrical stem extending through and disposed axially of said neck, a packing in the inner portion of the neck about said stem, and a packing gland screwed into the neck and rotatable on said stem outwardly of the packing, said furcations being of a width to close said passage when the valve plug is turned to one position, the space between said furcations being of a width to completely open said passage when the valve plug is turned to another position.

EDWARD A. MURNIN, Jr.

REFERENCES CITED

The following references are of record in the file of this patent:

UNITED STATES PATENTS

| Number | Name | Date |
|---|---|---|
| 563,946 | Wells | July 14, 1896 |
| 1,458,644 | Dempsey | Sept. 12, 1923 |
| 1,926,450 | MacGregor | June 12, 1933 |
| 2,432,225 | Carbon | Dec. 9, 1947 |